United States Patent
Ebi et al.

(10) Patent No.: US 9,624,981 B2
(45) Date of Patent: Apr. 18, 2017

(54) GAS PRESSURE BEARING ELEMENT

(71) Applicant: AeroLas GmbH, Unterhaching (DE)

(72) Inventors: Harald Ebi, Munich (DE); Michael Muth, Munich (DE)

(73) Assignee: AeroLas GmbH, Unterhaching (DE)

( * ) Notice: Subject to any disclaimer, the term of this patent is extended or adjusted under 35 U.S.C. 154(b) by 159 days.

(21) Appl. No.: 14/215,364

(22) Filed: Mar. 17, 2014

(65) Prior Publication Data

US 2014/0314345 A1    Oct. 23, 2014

(30) Foreign Application Priority Data

Mar. 21, 2013   (DE) .......................... 10 2013 102 924

(51) Int. Cl.
*F16C 32/06* (2006.01)
*F16C 33/28* (2006.01)
(Continued)

(52) U.S. Cl.
CPC .............. *F16C 43/02* (2013.01); *B23K 26/00* (2013.01); *F16C 29/025* (2013.01); *F16C 32/0618* (2013.01); *F16C 32/0622* (2013.01); *F16C 33/28* (2013.01); *F16C 2208/04* (2013.01); *F16C 2208/82* (2013.01);
(Continued)

(58) Field of Classification Search
CPC ................ F16C 29/025; F16C 32/0603; F16C 32/0614; F16C 32/0622; F16C 32/0662; F16C 32/0666; F16C 32/0681–32/0696; F16C 32/0618; F16C 33/28; F16C 43/02; F16C 2208/04; F16C 2208/82;
(Continued)

(56) References Cited

U.S. PATENT DOCUMENTS 3,429,544 A * 2/1969 Williams .............. F16C 29/025
239/557
4,263,361 A * 4/1981 Hodes ..................... B32B 15/14
384/297

(Continued)

FOREIGN PATENT DOCUMENTS

DE          2654644 A1    6/1978
DE       44 03 340 A1    8/1995
(Continued)

*Primary Examiner* — Alan B Waits
(74) *Attorney, Agent, or Firm* — Von Rohrscheldt Patents

(57) ABSTRACT

A gas pressure bearing element including a housing element with recesses, wherein the housing element is closed by a cover, wherein the recesses are defined by rib shaped intermediary walls and/or other island shaped protrusions and define first intermediary spaces between the intermediary walls and/or the island shaped protrusions, wherein the cover is formed in sections by a cured encasement compound provided with an open pore reinforcement mat, wherein the encasement compound has a flat surface that is processed after curing and forms a bearing surface for the gas pressure bearing element, wherein the bearing surface includes a plurality of gas outlet nozzles which are formed by micro holes penetrating the cover, and wherein the micro holes are provided at locations under which the first intermediary spaces are arranged below the cover, which first intermediary spaces form channels for a pressurized gas supply for the gas outlet nozzles.

5 Claims, 1 Drawing Sheet

(51) Int. Cl.
 *F16C 29/02* (2006.01)
 *F16C 43/02* (2006.01)
 *B23K 26/00* (2014.01)

(52) U.S. Cl.
 CPC ...... *F16C 2208/86* (2013.01); *F16C 2226/40* (2013.01); *F16F 2226/042* (2013.01); *Y10T 29/49639* (2015.01)

(58) Field of Classification Search
 CPC .. F16C 2208/86; F16C 2226/40; B23K 26/00; F16F 2226/042
 See application file for complete search history.

(56) References Cited

U.S. PATENT DOCUMENTS

| | | | | |
|---|---|---|---|---|
| 4,368,853 A | * | 1/1983 | Morishita | B05B 5/0415 239/223 |
| 5,564,063 A | * | 10/1996 | Heinzl | B22F 3/24 419/2 |
| 5,645,354 A | * | 7/1997 | Heinzl | B23K 26/389 384/100 |
| 5,800,066 A | * | 9/1998 | Hayashi | F16C 32/0618 384/100 |
| 6,296,990 B1 | * | 10/2001 | Kwan | F16C 29/025 355/53 |
| 6,515,288 B1 | * | 2/2003 | Ryding | F16C 29/025 250/441.11 |
| 7,607,647 B2 | * | 10/2009 | Zhao | B25B 11/005 269/20 |
| 7,785,009 B2 | * | 8/2010 | Saito | F16C 29/025 384/12 |
| 2008/0256797 A1 | * | 10/2008 | Lind | B23K 26/0823 29/898.02 |
| 2009/0297075 A1 | * | 12/2009 | Muneishi | F16C 29/025 384/12 |

FOREIGN PATENT DOCUMENTS

| | | |
|---|---|---|
| DE | 44 36 156 C1 | 3/1996 |
| DE | 100 62 603 A1 | 6/2002 |
| WO | WO2006075939 A1 | 7/2006 |

* cited by examiner

GAS PRESSURE BEARING ELEMENT

RELATED APPLICATIONS

This Application claims priority from and incorporates by reference German Patent Application DE 10 2013 102 924.8 filed on Mar. 21, 2013, which is incorporated in its entirety by this reference.

FIELD OF THE INVENTION

The instant invention relates to a gas pressure bearing element. It also relates to a method for producing the gas pressure bearing element and to a gas pressure bearing with the gas pressure bearing element.

BACKGROUND OF THE INVENTION

Gas pressure bearing elements of this general type are used in particular as air bearings. Gas pressure bearing elements have a bearing surface which leads into a plurality of gas outlet nozzles through which pressurized gas enters a bearing slot that is formed by the gas pressure bearing element and an opposite bearing element. In order to run pressurized gas to the gas outlet nozzles typically gas distribution structures are provided on a back side of the gas pressure bearing elements, wherein the bore holes forming gas outlet nozzles lead into the gas distribution structures.

DE 44 36 156 C1 discloses an aero static bearing that includes a bearing element with a plurality of grooves on its back side that is oriented away from the bearing surface wherein holes forming gas outlet nozzles are respectively bored into bases of the grooves wherein the holes lead into the bearing surface. The bearing element is closed with a cover at its backside wherein the cover is provided with an inlet opening for compressed air. Another variant described therein includes a bearing element that is provided with grooves for supplying the air bearings with air and which is provided with a thin metal foil at its bearing surface side into which holes are introduced that form gas outlet nozzles.

WO 2006/040073 A1 discloses a gas pressure bearing arrangement for a rotating element in which the rotating element is provided with circumferentially extending recesses and includes a bearing sleeve at its outer circumference which closes the recess. Pass through bore holes are provided in the bearing sleeve wherein the pass through bore holes on the one hand side lead into the recess and on the other hand side into the bearing surface formed by the outer circumference of the bearing sleeve to form gas outlet nozzles therein.

DE 44 03 340 A1 illustrates and describes a method for producing micro nozzles of an aero static bearing. During this method plural holes are introduced with a laser beam into a compressed surface of a porous sinter material wherein the holes are arranged distributed over the surface. The holes form micro nozzles of an aero static bearing. The micro nozzles are supplied with air through the porous sinter material wherein, however, no defined channels are provided in the sinter material for supplying the micro nozzles, but the open pores of the sinter material are used to run air to the micro nozzles.

DE 100 63 603A1 illustrates and describes an aero static bearing with air nozzles provided in the bearing surface of a first bearing element. The air nozzles are connected with a compressed air source through at least one feed conduit. In order to supply the air nozzles supply channels for compressed air are formed in an interior of the bearing element wherein the supply channels are formed by bore holes. Providing such supply bore holes is not only complex but it requires additionally that the bore holes are closed again in a portion of an outer surface of the bearing element. Complexity of providing an aero static bearing with a compressed air supply structure is therefore significant.

The components of known air bearings are precision parts which require highly precise manufacture which is expensive.

BRIEF SUMMARY OF THE INVENTION

Thus, it is the object of the present invention to provide a gas pressure bearing element and a method for producing the gas pressure bearing element and a gas pressure bearing with the gas pressure bearing element, wherein manufacturing cost for the gas pressure bearing element is less than for the prior art without impairing quality and reliability of the gas pressure bearing.

The object of the invention relating to a gas pressure bearing element is achieved by a gas pressure bearing element including a housing including a housing element with recesses configured in one of plural surfaces of the housing element, wherein the housing element is closed with a cover at its open side, wherein the recesses are defined by rib shaped intermediary walls and/or other island shaped protrusions and define first intermediary spaces between the intermediary walls and/or the island shaped protrusions, wherein the cover is at least formed in sections by a cured encasement compound provided with an open pore reinforcement mat, wherein the encasement compound has a flat surface that is processed after curing and forms a bearing surface for the gas pressure bearing, and wherein the bearing surface includes a plurality of gas outlet nozzles which are formed by micro holes penetrating through the cover, wherein the micro holes are provided at locations under which the first intermediary spaces are arranged below the cover which first intermediary spaces form channels for a pressurized gas supply for the gas outlet nozzles.

The configuration of the gas pressure bearing element according to the invention and in particular of its cover facilitates to initially produce the housing element provided with the recesses and the intermediary spaces. The recesses and intermediary spaces which subsequently form a pressurized gas supply system for the gas outlet nozzles are fabricated for example by milling or through pressure casting or through injection molding in case the housing element is made out of plastic material. The cover is then applied to this housing element wherein the cover is surface treated and provided with the bore holes. A compressed gas pressure bearing element can be produced quickly in a cost effective manner and also in large numbers and its reliability is par with conventional gas pressure bearing elements made entirely from metal.

In an advantageous embodiment of the invention the housing element includes a circumferential wall and second intermediary spaces are formed between the circumferential wall and the rib shaped intermediary spaces and the other island shaped protrusions wherein the second intermediary spaces form a circumferential channel.

Advantageously the reinforcement mat is configured as a flat contexture, for example a fleece, a woven material or a knitted material. The reinforcement mat can for example be made from glass fiber or carbon fiber. Also the housing element can be made from a composite material, for example carbon fiber composite material.

The object of the invention is achieved through a method for producing a gas pressure bearing element with the features of claim 4 including the following steps:

a) providing a housing element that is provided with recesses and advantageously with a circumferential wall, wherein the recesses are defined by rib shaped intermediary walls and/or other island shaped protrusions and define first intermediary spaces, wherein second intermediary spaces that define a circumferential channel are formed between the rib shaped intermediary walls and/or the other island shaped protrusions and the advantageously provided circumferential wall;

b) applying a cover to the housing element or the side of the housing element provided with recesses;

c) drilling micro holes through the cover, the micro holes forming gas outlet nozzles at locations where the first intermediary spaces are arranged below the cover.

This cover can be made completely from plastic material or from a fiber composite material (for example glass fiber composite material or carbon fiber composite material) and can be applied to the housing element as a prefabricated cover element in which the micro holes are bored according to feature c) after applying the cover.

Alternatively the cover can be directly laminated onto the housing element as stated in patent claim 4. Thus step b) of applying the cover is performed in the following partial steps:

b1) applying an adhesive to the faces of the intermediary walls and of the island shaped protrusions and optionally onto a face of the circumferential wall;

b2) positioning the open pore reinforcement mat on the respective face of the intermediary walls and the island shaped protrusions and optionally on the face of the circumferential wall and fixating the reinforcement mat on the intermediary walls and on the island shaped protrusions on the circumferential wall and through the adhesive.

b3) Applying the encasement compound onto the open pore reinforcement mat, wherein a viscosity of the encasement compound, its curing time, a porosity of the reinforcement mat and thickness of the reinforcement mat are matched so that the encasement compound drenches the reinforcement mat but does not run into the intermediary cavities through the reinforcement mat.

b4) curing the encasement compound: and b5) processing an outer surface of the unit forming the cover including encasement compound and reinforcement mat, preferably milling, grinding, and polishing of the surface in order to obtain a flat and smooth bearing surface for the gas pressure bearing.

This manufacturing method can as already stated with respect to the gas pressure bearing element according to the invention be performed quickly and in a cost effective manner in large numbers and furthermore facilitates an individual shape of the gas pressure bearing element. The open pore reinforcement mat thus forms a reinforcement structure onto which the encasement compound is cast and distributed. The open porosity of the reinforcement mat, this means the size and number of openings provided in the surface and in the thickness structure of the reinforcement mat and the cavities and the viscosity of the encasement compound that is adapted to the porosity of the reinforcement mat provide that the encasement compound distributed on the reinforcement mat penetrates the openings and cavities of the reinforcement mat but does not flow through the openings and cavities into the recesses of the housing element, thus into the cavities or intermediary spaces provided therein so that the encasement compound closes the cavities or intermediary spaces. After curing the encasement compound the outer surface of the cover is surface treated with conventional tools, for example milled, ground and polished so that a smooth bearing surface is formed. Micro holes are then introduced into the bearing surface which penetrate through the cover and lead on the one hand side into the bearing surface and on the other hand side into the cavities and intermediary spaces of the housing element arranged under the cover, thus into the channels of the pressurized gas supply.

Advantageously additional micro holes forming gas outlet nozzles are drilled in step c) into the cover at locations where the circumferential channel adjacent to the circumferential wall is arranged under the cover. Thus, the gas outlet nozzles are not only provided in the first intermediary spaces between the rib shaped intermediary walls and the other island shaped protrusions but additionally also along the circumference so that pressurized gas exiting from the gas outlet nozzles generates bearing support forces also along the circumference of the gas pressure bearing element.

It is particularly advantageous when boring the micro holes forming the gas outlet nozzles is formed through a high energy beam, preferably through a high energy laser beam. This technique of boring micro holes facilitates boring gas outlet nozzles with a very small diameter which in turn leads to low gas consumption while maintaining high bearing support forces and a high level of bearing stiffness.

Advantageously the reinforcement mat is formed by a flat contexture, for example a fleece, a woven or knitted material.

Advantageously a synthetic resin, for example epoxy resin, is used as an encasement compound.

When a synthetic resin is used for an adhesive which is identical with the synthetic resin of the encasement compound or which enters a firm monolithic mechanical connection with the encasement compound after curing this creates a cover plate that is stiff by itself and firmly connected with the housing element.

The gas pressure bearing element according to the invention furthermore provides a gas pressure bearing which includes at least one stationary bearing element and at least one bearing element that is rotated or moved in a linear manner, wherein either the stationary bearing element or the moved bearing element is formed by a gas pressure bearing element according to the invention. A gas pressure bearing of this type is not only cost effective but also reliable and can be configured very light when also the housing element is not made from metal but from a plastic material, for example a fiber reinforced plastic material like for example carbon fiber composite material.

The gas pressure bearing and consequently also gas pressure bearing element can be configured flat and for a translatoric or rotating movement in the plane of the bearing surface, however it can also be configured cambered and configured for example for a pivoting or rotating movement along a bearing surface that is configured as a circumferential surface.

The invention is subsequently described in more detail based on an embodiment with reference to the drawing figure, wherein:

BRIEF DESCRIPTION OF THE DRAWINGS

The invention is subsequently described in more detail based on an embodiment with reference to the drawing figure, wherein.

DETAILED DESCRIPTION OF THE INVENTION

Figure 1:
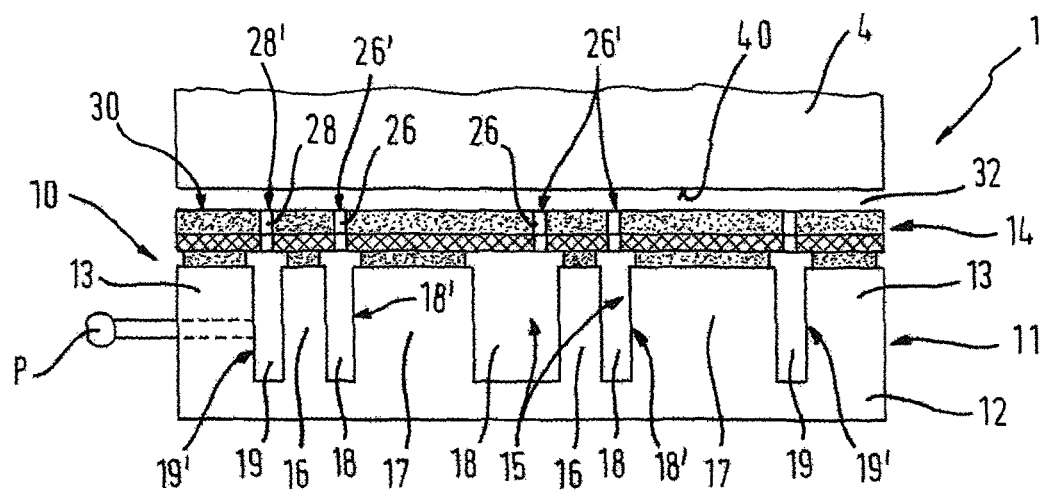
FIG. 1 illustrates a cross section of a gas pressure bearing with a gas pressure bearing element according to the invention in the plane I in FIG. 2.

FIG. 1 illustrates a gas pressure bearing 1 with a gas pressure bearing element 10 configured according to the invention. The gas pressure bearing element 10 includes a housing 11 which includes a housing element 12 provided with recesses 15 and with a circumferential wall 15 and a cover 14. The circumferential wall 13 of the housing element 12 envelops the portion provided with recesses which is covered by the cover 14 that is firmly attached at the housing element 12. The recesses 15 are defined by rib shaped intermediary walls 16 and island shaped recesses 17 and form first intermediary spaces 18 between the intermediary walls 16 and the island shaped protrusions 17.

Figure 2:
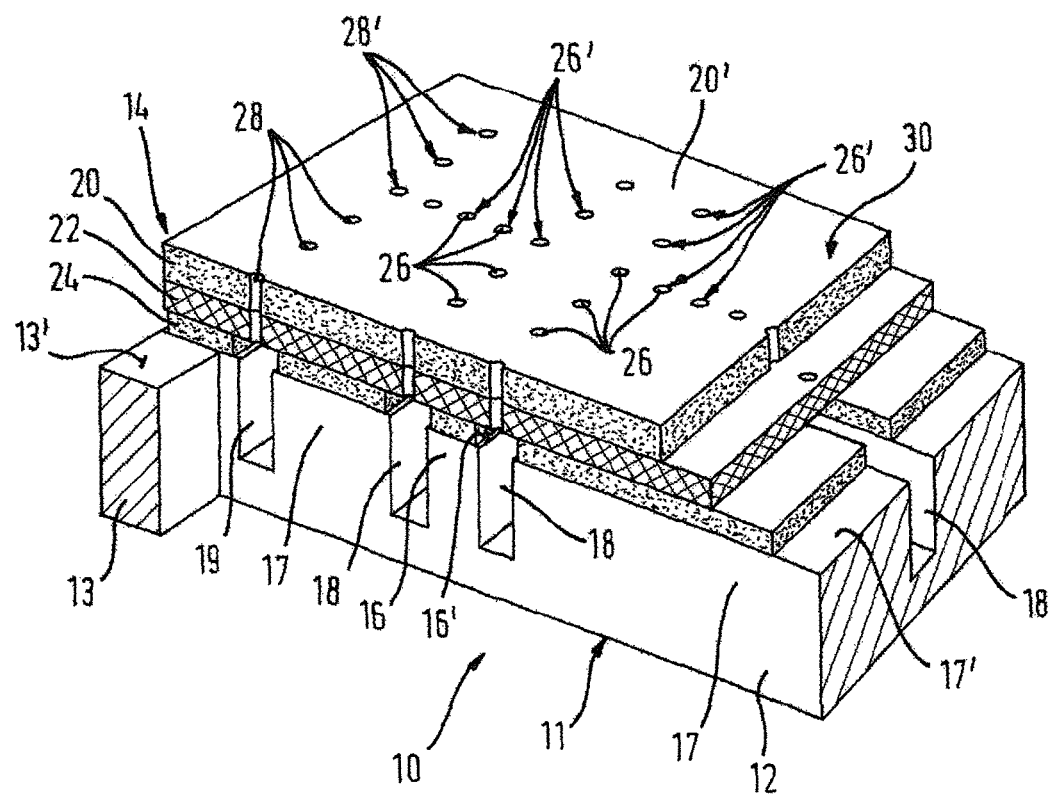
FIG. 2 illustrates a partial sectional perspective view of a gas pressure bearing element according to the invention.

FIG. 2 illustrates a partially sectional perspective view of the gas pressure bearing element 10 according to the invention. The cover 14 is either entirely or partially made from an open pore reinforcement mat 22 that is drenched with an encasement compound 20 wherein the reinforcement mat is applied with an adhesive 24 to the face 13' of the circumferential wall 13, to the face 16' of the intermediary walls 16 and to the free face 17' of the island shaped protrusions. A plurality of micro holes 26 is drilled into the cover so that they penetrate the cover 14 at locations under which the first intermediary spaces 18 are arranged. The first intermediary spaces 18 form channels 18' for the pressurized gas supply.

Furthermore micro holes 28 are provided in the cover at locations under which second intermediary spaces extending along the circumferential wall 13 are arranged between the circumferential wall 13 and an adjacent intermediary wall 16 or an adjacent island shaped protrusion 17 and which form a circumferential channel 19'.

The first and second intermediary spaces 18, 19 form channels 18', 19' of a distribution system for the pressurized gas that is arranged in an interior of the gas pressure bearing element and are thus in fluidic connection with one another. The system of the channels 18', 19' is supplied with pressurized gas, advantageously compressed air by a non illustrated pressurized gas source through a pressurized gas connection P that is run in outward direction out of the gas pressure bearing element.

The bore holes 26, 28 configured as micro holes which penetrate the cover 14 form gas outlet nozzles 26', 28' at their outlets into the surface of the cover 14 that is configured as bearing surface 21 and oriented away from the housing element 12.

The configuration of the cover 14 fabricated in a composite configuration according to the method according to the invention is described infra.

The cover 14 includes an open pore reinforcement mat 22 which is initially glued on a large surface with an adhesive 24, for example a synthetic resin onto the respective face 13', 16', 17' oriented upward in FIG. 2 of the circumferential wall 13 and of the intermediary walls 16 and the island shaped protrusions 17. After the open pore reinforcement mat 22 is glued down through the adhesive 24 and thus fixated and before the adhesive 24 is cured an encasement compound 20 is applied to the reinforcement mat 22, wherein the encasement compound is also made from a synthetic resin which advantageously corresponds to the synthetic resin of the adhesive 24 or which enters a firm connection therewith after curing. Ideally the same synthetic resin is used for the adhesive 24 and also for the encasement compound 20.

The encasement compound 20 applied to the open pore reinforcement mat 22 penetrates the open pores and the cavities of the reinforcement mat 22 without flowing through them. The encasement compound 20 penetrating the reinforcement mat 22 connects in an interior of the reinforcement mat 22 with the adhesive 24 penetrating the reinforcement mat 22 from below since both are made from the same synthetic resin or from synthetic resins that connect well therewith. The encasement compound 20 and the adhesive 24 thus enter a monolithic connection after curing within and outside of the open pore reinforcement mat 22. An amount of the encasement compound 20 is applied to the reinforcement mat 22, so that the reinforcement mat 22 is not only completely covered by the encasement compound 20, but also so that an overhang of the encasement compound 20 remains. The uneven outer surface of the encasement compound that is produced after curing the encasement compound 20 is subsequently processed through milling, grinding and polishing so that the processed surface 20' is flat and uniformly smooth. The processed surface 20' then forms the bearing surface 30 for the gas pressure bearing element 10.

After this mechanical processing step of the surface 20' micro holes 26, 28 are drilled into the unit forming the cover 14 including encasement compound 20 and reinforcement mat 22 and adhesive 24 at locations of the cover 14 which are arranged above the channels 18'. The micro holes 26 penetrate the cover 14 and thus lead on the one hand side into the respective channel 18 and on the other hand side lead in outward direction into the bearing surface 30 where they form the gas outlet nozzles 26'. Drilling through the cover 14 is performed additionally at locations above the circumferential channel 19 extending along the circumferential wall 13 so that micro holes 28 are formed.

The micro holes 26, 28 form gas outlet nozzles 26', 28' at their outlets into the bearing surface 30 for a pressurized gas, for example compressed air, which is introduced by a non illustrated pressurized gas supply device through an also non illustrated pressurized gas conduit and the pressurized gas connection P into the pressurized gas distribution system of the channels 18', 19' in an interior of the housing 11. The pressurized gas passes through the micro holes 26, 28 through the cover 14 and exists at the gas outlet nozzles 26', 28' and enters into a bearing gap 32 formed between the bearing surface 30 of the gas pressure bearing element 10 and a bearing surface 40 of an opposite bearing element 4, wherein the bearing surface 40 is arranged opposite to the bearing surface 30 (FIG. 1). The pressurized gas forms a gas cushion in the bearing gap 32 for supporting the opposite bearing element 4 on the gas pressure bearing element 10. It is certainly possible to use other suitable pressurized gasses for the bearing instead of compressed air.

The invention is not limited to the embodiment recited supra which is only used to generally line out the core idea of the invention. Within the scope of the invention the device according to the invention can also be configured as an embodiment that differs from the one described supra. The device can thus have in particular features which are a combination of individual features of the patent claims.

Reference numerals in the claims, the description and the drawings are only used for better understanding the invention and do not limit the scope of patent protection which is only defined by the appended patent claims.

What is claimed is:

1. A gas pressure bearing element, comprising:

a housing including a housing element with recesses configured in one of plural surfaces of the housing element, wherein the housing element is closed by a cover at an open side of the housing element, wherein the recesses are defined by intermediary walls or other protrusions and define first intermediary spaces between the intermediary walls or the other protrusions, wherein the cover is at least formed in sections by an open pore reinforcement mat provided with a cured encasement compound, wherein the open pore reinforcement mat is fixated relative to the intermediary walls and relative to the other protrusions by an adhesive made from a synthetic resin provided between the housing element and a lower side of the reinforcement mat, wherein the reinforcement mat is drenched with the cured encasement compound that forms a layer of the cured encasement compound on an upper side of the reinforcement mat, wherein the encasement compound penetrates the reinforcement mat but does not penetrate the intermediary spaces of the housing element, wherein the encasement compound is made from the synthetic resin, wherein the cured encasement compound on the upper side of the reinforcement mat has a flat surface that is machined and forms a bearing surface for the gas pressure bearing element, wherein the bearing surface includes a plurality of gas outlet nozzles which are formed by micro holes penetrating through the cover, and wherein the micro holes are provided at locations under which the first intermediary spaces are arranged below the cover, which first intermediary spaces form channels for a pressurized gas supply for the gas outlet nozzles.

2. The gas pressure bearing element according to claim 1, wherein the housing element includes a circumferential wall, wherein second intermediary spaces are formed between the circumferential wall and the intermediary walls or the other protrusions, and wherein the second intermediary spaces form a circumferential channel.

3. The gas pressure bearing element according to claim 1 wherein the reinforcement mat is a flat contexture configured as a fleece, a woven material or a knitted material.

4. A gas pressure bearing with the gas pressure bearing element according to claim 1, wherein the gas pressure bearing includes at least one stationary bearing element and at least one rotating bearing element or at least one bearing element that is moved in a linear manner, and wherein either the at least one stationary bearing element or the at least one rotating bearing element or the at least one bearing element that is moved in a linear manner is formed by the gas pressure bearing element according to claim 1.

5. The gas pressure bearing according to claim 4, wherein the gas pressure bearing is configured as an air bearing.

* * * * *